July 7, 1931.  C. A. HENNEUSE  1,812,875
TRACTOR
Original Filed Dec. 29, 1919   3 Sheets-Sheet 1
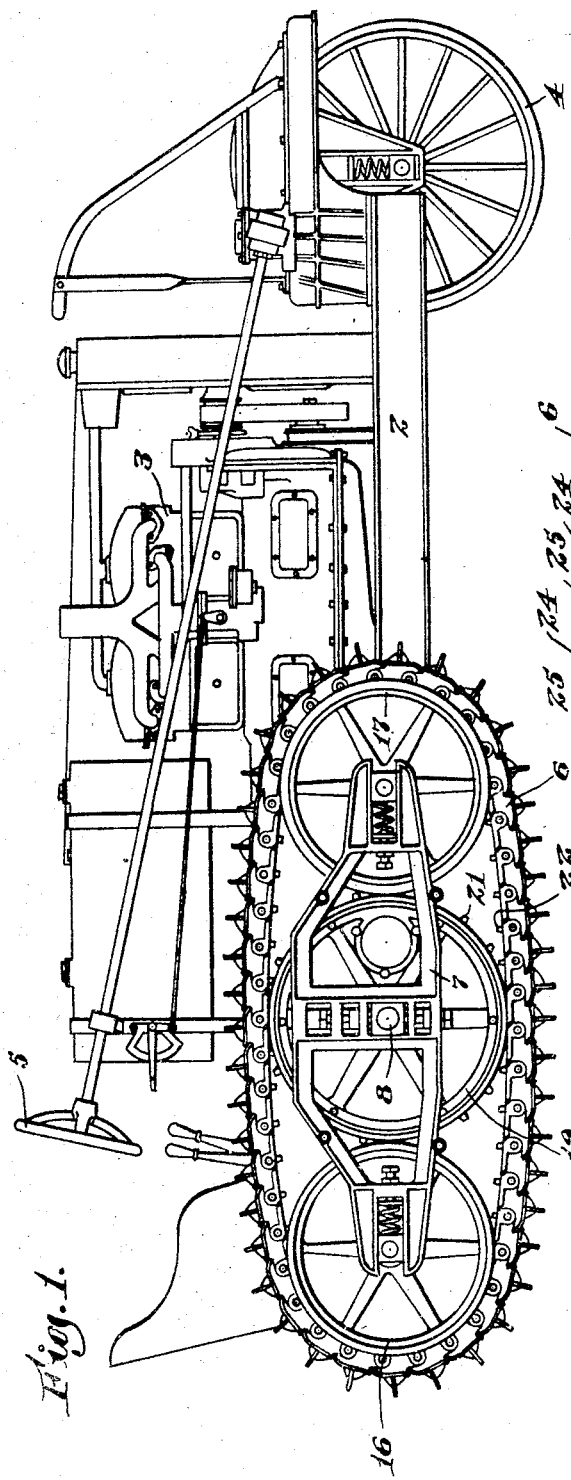
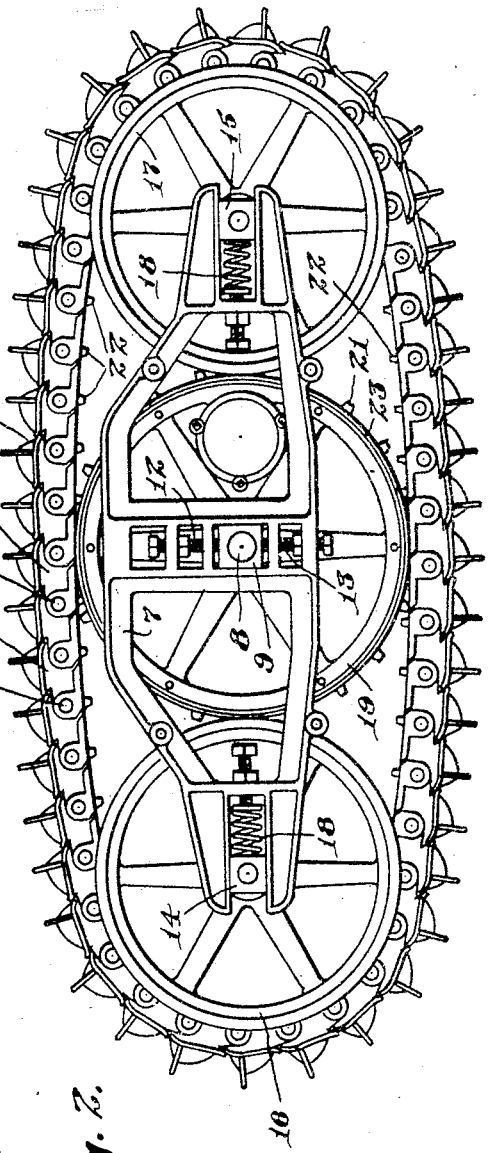
Inventor
Clarence A. Henneuse
by James R. Hodder
Attorney

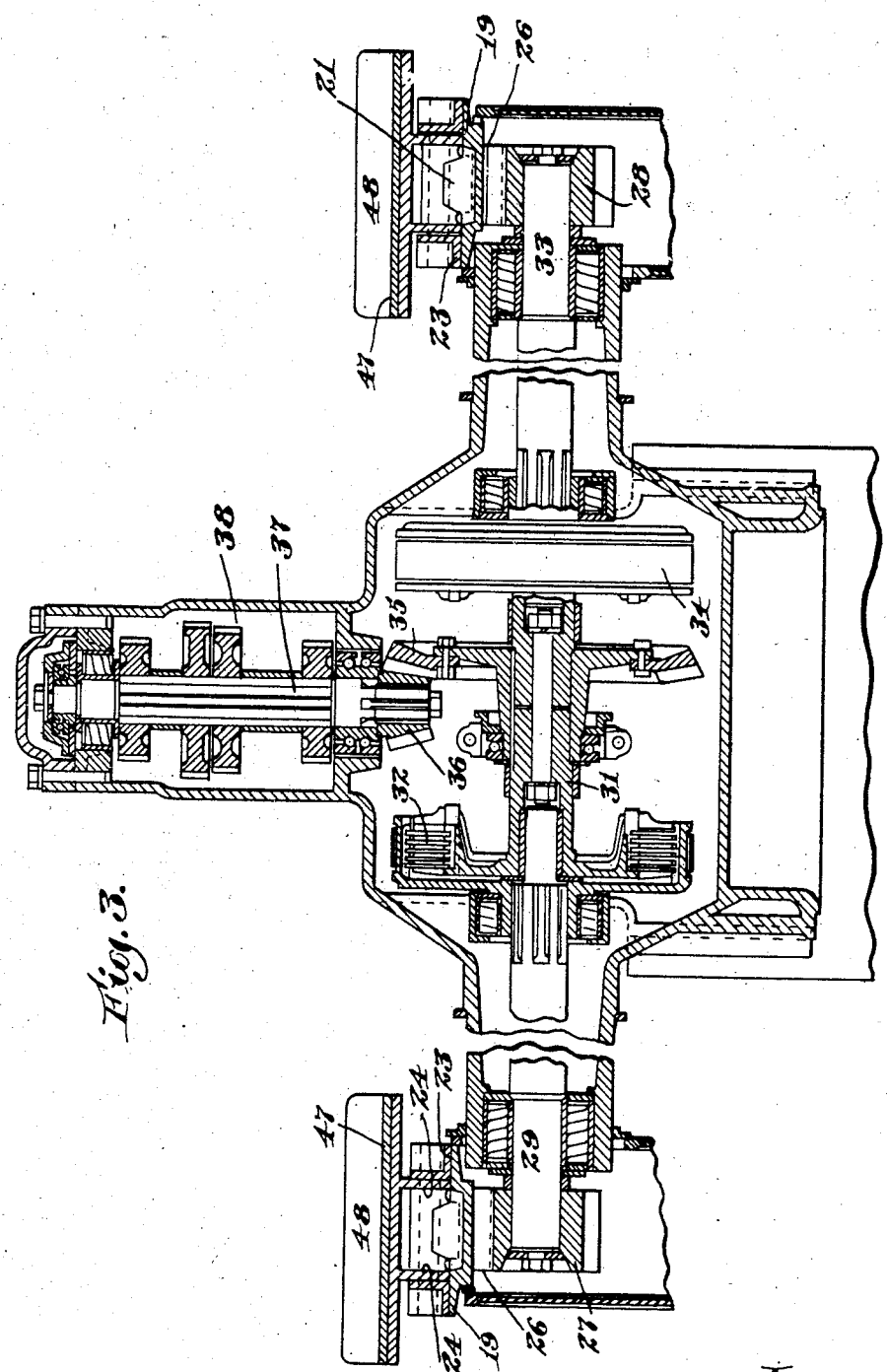

July 7, 1931.  C. A. HENNEUSE  1,812,875
TRACTOR
Original Filed Dec. 29, 1919  3 Sheets-Sheet 3

Inventor
Clarence A. Henneuse
by James R. Hodder
Attorney

Patented July 7, 1931

1,812,875

UNITED STATES PATENT OFFICE

CLARENCE A. HENNEUSE, OF SACRAMENTO, CALIFORNIA, ASSIGNOR TO HADFIELD-PENFIELD STEEL COMPANY, OF BUCYRUS, OHIO, A CORPORATION OF OHIO

TRACTOR

Refile of abandoned application Serial No. 348,009, filed December 29, 1919. This application filed June 20, 1925. Serial No. 38,549.

This invention relates to tractors and particularly to tractors of the "creeper" or "track layer" type, and is a refile of applicant's abandoned application Ser. No. 348,009, filed December 29, 1919.

An object of the invention is to provide a track which can be driven over the ground with a minimum of resistance.

Another object of the invention is to provide a self supporting track in which wear is reduced to a minimum, and which is capable of efficient operation on uneven or marshy ground or sand.

A further object of the invention is to provide a track mounting which is adjustable to maintain it in operative position to produce the above mentioned advantages.

A further object of the invention is to provide a track which preferably lies in a flat arc in contact with the ground, so that while the weight of the tractor is distributed over a large area the pressure at the center of the track is greater than at other points thereon, so that the tractor may be readily turned.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one form of tractor of my invention but it is to be understood that I do not limit myself to such form, since the invention as set forth in the claims may be embodied in a plurality of forms.

Referring to the said drawings,

Fig. 1 is a side elevation of one form of tractor of my invention;

Fig. 2 is a side elevation of the track and track frame on a larger scale;

Fig. 3 is a horizontal section through a portion of the tractor showing the driving mechanism, the broken away end portions being shown in vertical section;

Figure 4:
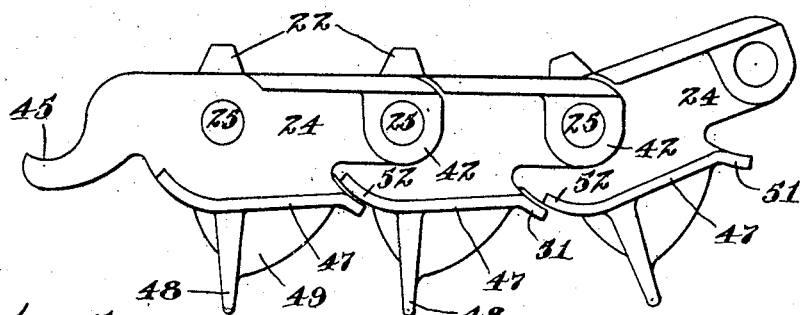
Fig. 4 is a side elevation of several connected track links.
Figure 5:
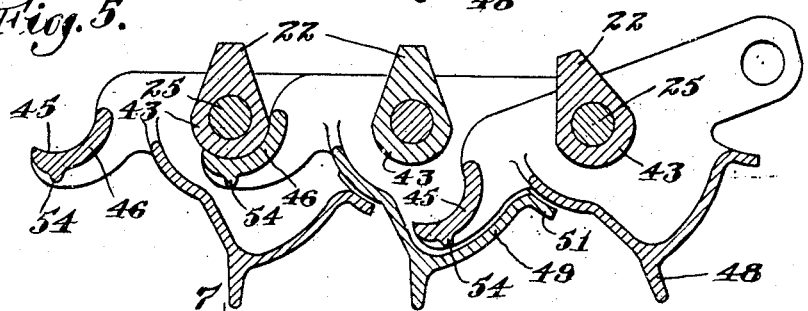
Fig. 5 is a longitudinally vertical section through several connected track links.
Figure 6:
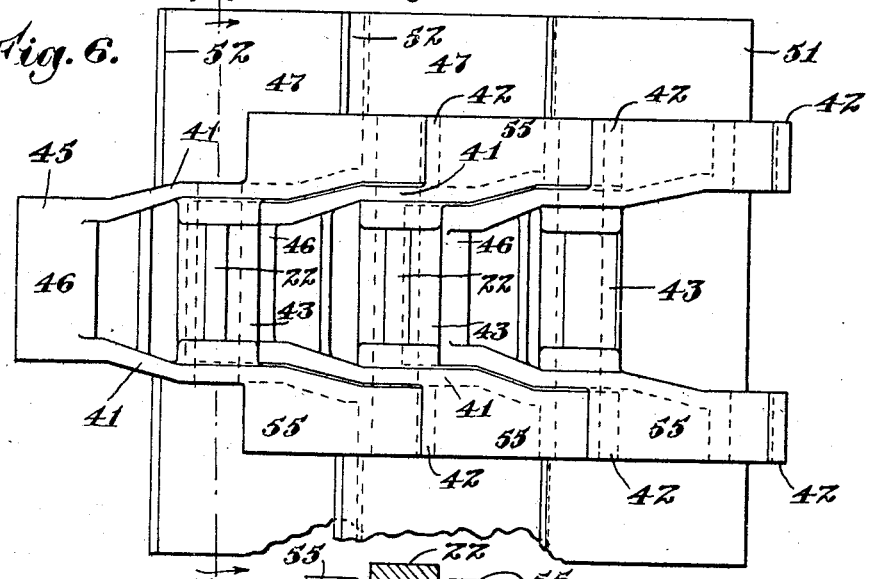
Fig. 6 is a plan or top view of several connected track links.
Figure 7:
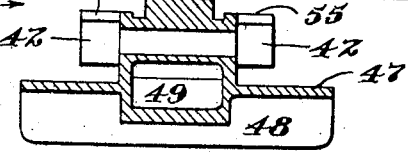
Fig. 7 is a transverse vertical section through a link, taken on the line 7—7 Fig. 6.

The tractor of my invention which is of the creeper type, comprises a body or frame 2 upon which the engine 3 or other prime mover is mounted. Journalled on the frame at the forward end is a tiller wheel 4, which is rotatable about a vertical axis by the hand wheel 5. Arranged on opposite sides of the frame, adjacent the rear end thereof are endless supporting tracks 6 upon which the major portion of the weight of the tractor is carried. Each track is supported on a frame 7, which is mounted on a shaft or axle 8, secured to the body 2. The axle 8 is journalled in a block 9, disposed at the longitudinal center of the frame and this block is adjustable vertically by the screws 12—13 for reasons which will hereinafter appear. Disposed in suitable horizontal guide-ways at the ends of the frame, are journal blocks 14—15, in which the idler 16—17 are journalled. The endless flexible track 6 passes over the idler wheels, which are provided with suitably grooved faces, to receive the track. The journal blocks 14—15 are pressed longitudinally by adjustable springs 18, to keep the track taut and to vary the relative positions of the idlers with respect to the axle 8. The track frame is connected at its longitudinal center to the tractor frame, so that the track is capable of oscillation about its center.

Mounted on the axle 8 is a driving sprocket wheel 19, which engages the upper and lower runs of the track. The sprocket wheel is of greater diameter than the idler wheels and is provided with teeth 21 which engage teeth 22 on the track links and is provided with tread surfaces 23 at the pitch line which engage on the rollway of the track, so that the sprocket also carries a large portion of the weight of the tractor, thus reducing the strain on the track and track supports.

The idler wheels 16 and 17 are adjustable longitudinally so that the track may be moved to cause the sprocket to drive, at all times, on the lower run of the track. This is accomplished by insuring engagement of the sprocket teeth and lower track teeth in advance of any possible engagement with the upper track teeth and in practice, engagement with the upper track teeth is avoided. By this arrangement, the driving strain is localized on the stationary portion of the track which is in engagement with the ground and no driving strain is placed on the link connections, during the time that adjacent links are in relative motion, as when moving onto or from the idler wheels. By eliminating undue strain wherever there is relative motion, wear of the track is reduced to a minimum.

Each track consists of a series of links or shoes 24, hinged together by the pins 25. The links are constructed so that when hinged together, they form a track flexible in one direction and rigid in the opposite direction, that is, the links are free to move to form a convex track as when passing over the idlers, but cannot move to form a concave track. The links are preferably formed so that the portion of the track which lies in contact with the ground is slightly convex or curved downwardly and the sprocket engages the track at the center of the convexity. This track construction produces a rigid track surface at all times, regardless of the condition of the ground surface, enabling the track to bridge small inequalities of the ground surface and to travel over soft ground and distributes the weight of the tractor evenly over soft ground, in both instances reducing the rolling resistance to a minimum. The curvature of the track in contact with the ground enables the tractor to be readily and quickly steered and permits it to smoothly operate over rough ground.

Secured to or formed integral with the sprocket wheels 19 are internal gears 26 which are engaged by the driving pinions 27—28. The driving pinion 27 is secured to the transverse shaft 29 which is coupled to the main transverse shaft 31 by a clutch 32 and the driving pinion 28 is secured to the transverse shaft 33 which is coupled to the main transverse shaft 29 by a clutch 34. By releasing one or the other of the clutches 32—34 one track or the other may be driven to cause the tractor to turn. Secured to the main transverse shaft 31 is a bevel gear 35 which is engaged by the bevel pinion 36 on the driven shaft 37 of the variable speed mechanism 38. The driving shaft of the variable speed mechanism is not shown, but is connected to the engine in the usual manner through a suitable clutch.

The track consists of a series of links or shoes 24 connected together by hinge pins 25. The shoe is preferably an integral casting comprising side walls 41 connected together by suitable transverse members. The side walls diverge from each other longitudinally forming a female end provided with bosses 42 through which the hinge pin passes. The male portion of the shoe is disposed substantially at the longitudinal center of the shoe and is provided with a cored transverse member 43 which, when the shoes are assembled, fits between the bosses 42 of the next adjacent shoe and the hinge pin passes through the bosses and the member 43. The member 43 is provided on its upper surface with an integral tooth 22, which is engaged by a sprocket tooth on the lower run of the track. The side plates extend past the tooth 22 on that side of the tooth remote from the bosses 42 and the upper surfaces of the extended side walls are curved downwardly on the radius of the lower surface of the member 43, to form a hook 45 which engages under the member 43 to prevent further rotational movement of one link with respect to the other. At the hook portion 45, the side walls are connected by a web 46, the upper surface of which is curved to conform to the curvature of the hook, forming a seat which bears against the lower side of the member 43 when the links reach a position of parallelism or approximate parallelism. The parts of the shoes are preferably so positioned and proportioned that the extended position of one shoe seats against the central transverse member 43 of the other shoe as the two shoes approach parallelism and before they reach parallelism, so that the extended track will lie in a shallow arc as shown in Fig. 1, but the parts may be positioned and proportioned when desired, so that the shoes may move into parallelism. In the first instance, a slightly curved rigid track is provided and in the other case, a straight rigid track is produced.

Each shoe is provided intermediate its ends with an integral bottom plate or tread plate 47, extending transversely of the shoe and extending beyond the side walls. The tread plate is provided on its lower surface with a transversely extending rib or cleat 48 and between the side walls, the plate is provided with a downwardly extending curved portion 49, forming a grouser for increasing the tractive effect of the track on the ground. The tread plate 47 is of less length than the shoe and at its forward end is provided with a downwardly extending curved lip 51, the upper surface of which is concentric with the axis of the hinge pin passing through the adjacent end of the shoe. At its rear end, the tread plate is provided with an upwardly curved lip 52, the lower surface of which is concentric with the axis of the hinge pin passing through the center of the shoe. In assembly, the hinge pin passing through the end sockets of one shoe, passes centrally through the adjacent shoe, and the forward lip 51 on one shoe underlies the rear lip 52 on the adjacent shoe, and both lips are concentric with the same hinge pin. The lips, which are in fact curved portions of the tread plates are preferably spaced apart radially, with relation to the axis of the pin, a slight distance, so that they are not in frictional contact, but are sufficiently close together to form a rather close joint between the successive tread plates of the track. As one link moves angularly with respect to the adjacent link, the hooked extension of one link moves down into the pocket within the link formed by the grouser 49 and the web 46 is provided with a downwardly extending rib 54 which contacts with the surface of the pocket and limits the inclination of one link with respect to the adjacent link. The permissible angular movement is sufficient to permit the track to flex as it passes over the idler wheels on the track frame. The side walls 41 of the shoes are provided at the female ends with track flanges 55, lying flush with the upper surfaces of the side walls, and extending outwardly therefrom to the outer edges of the bosses 42. These track flanges extend backward to adjacent the central transverse member 32 and at their ends, the under surfaces thereof are curved, so that these ends 56 make a close joint with the bosses 42 on the next succeeding shoe. The successive track flanges form a continuous track over which the tread surfaces 23 of the sprocket roll. By virtue of this construction there is provided a rigid track composed of one-piece shoes hinged together by pins which are not subjected to driving strain while they are subjected to angular movement of the shoes. This not only produces a minimum of wear on the track but reduces the rolling resistance of the tractor to a minimum.

I claim:

1. In a tractor, an endless flexible track composed of a plurality of links, pins connecting said links, elements on each of said links forming a substantially closed outer surface throughout the entire track, a tooth on each link in vertical alignment with respect to the pin, each of said teeth lying clear of and spaced from the ground engaging portion of said links, a driving sprocket and teeth on said sprocket adapted to engage the track teeth.

2. In a tractor, an endless flexible track composed of a plurality of links, pins connecting said links, elements on each of said links forming a substantially closed outer surface throughout the entire track, an inwardly extending tooth on each link through which the connecting pin passes, each of said teeth being spaced from the ground engaging portion of said links, and a driving sprocket provided with teeth engaging said track teeth.

In testimony whereof, I have signed my name to this specification.

CLARENCE A. HENNEUSE.